350-167. SR
06-22-71 XR 3,586,592

June 22, 1971 L. CAHN 3,586,592

THREE DIMENSIONAL PICTURE

Filed Jan. 15, 1968 3 Sheets-Sheet 1

INVENTOR.
LEO CAHN
BY Edward Halle
ATTORNEY

THREE DIMENSIONAL PICTURE

INVENTOR.
LEO CAHN
BY Edward Halle
ATTORNEY.

INVENTOR.
LEO CAHN
BY
Edward Halle
ATTORNEY.

3,586,592

THREE DIMENSIONAL PICTURE

Leo Cahn, 30 Salem Way, Glen Head, N.Y. 11545

Continuation-in-part of applications Ser. No. 370,009, May 25, 1964, and Ser. No. 451,537, Apr. 28, 1965. This application Jan. 15, 1968, Ser. No. 698,023
Int. Cl. B44f 1/00
U.S. Cl. 161—2 12 Claims

ABSTRACT OF THE DISCLOSURE

This invention is concerned with various forms of three dimensional pictures and changeable pictures in which the three dimensional and changeable effect is created by the use of two different views made up in alternate striations which are placed on curved reflecting mirrors without the use of lenticular or other types of lenses, and in which further curves transverse to the first mentioned curved reflecting mirrors are provided to enhance the brightness and viewability of the picture.

This application is a continuation in part application of my prior filed application for Three Dimensional Picture, filed May 25, 1964, Ser. No. 370,009, now abandoned; and my prior filed application for Three Dimensional Picture, filed Apr. 28, 1965, Ser. No. 451,537, now U.S. Pat. No. 3,365,350.

The present invention pertains to the art of producing a three dimensional picture, in particular a picture which has the appearance of depth without the help of any special auxiliary viewing device. Such pictures, produced by any of the known printing methods, have been known for decades. They consist of generally opaque or transparent sheets of paper, paper board, plastic material, etc. with an imprint in black and white or color, laminated to a lenticular face plate of transparent material; or they are made of a transparent plastic carrier sheet, printed on the back of same, to be viewed through the face of said plastic sheet which has on its face a lenticular system. The imprint is basically made of two pictures which are combined in alternate striations. The vertical line elements or striae of one picture are alternated with similar line elements or striae of the second picture, forming a vertical grid of parallel lines in striation. One of the pictures consists of a right-eye view of an object, and the other picture a left-eye view of the same object in normal visual parallax. Since the face plate carries on its surface a vertical fluting, which forms the aforementioned vertical lenticular system, we obtain an optical effect. I define "vertical" to mean perpendicular lines of a picture held up facing the eyes. "Horizontal" means an imaginary line drawn through the two pupils of the eyes of the viewer at right angles to the aforementioned vertical lines. The "fluting" is made up of vertical parallel ridges which have a near-parabolic or circular smooth surface creating a multi-lenticular system of convex lenses. These convex lenses have a plane side formed at the rear of the flat sheet of the plastic plate. These plane convex lenses give up the desired optical effect which is to divert light rays from the striae making up the right-eye elements of the picture into the right eye, and in the same way, the left-eye elements of the picture into the left eye of the viewer, thereby creating the illusion of three-dimensional vision in the viewer's mind.

Most of the incoming light rays that hit the picture after passing through the plastic face plate are reflected and some are absorbed. On their way back from the picture through the lenticular system, some rays are deflected completely and become ineffective, but a certain percentage of these rays will exit through the lenticular system and will be deflected through the focus of each lens to the proper eye. The left-eye and right-eye pictures become separated because each lens of the system is arranged in such a way that its location covers as exactly as possible a pair of alternate left-eye and right-eye picture elements. The light rays coming from the right-eye element of the picture are focused into the right eye of the viewer. Similarly, the left-eye pictorial element will send a ray through the focus of the lenticular system into the left eye of the viewer. The sum of all these light rays, or beams, will create the illusion of a three-dimensional picture.

There is an obvious relationship between the width of the right-eye and left-eye pictorial elements or striae and the thickness of the lenticular plate, i.e. a certain thickness is required to properly project the light beams into the viewer's eyes. The thickness of the plate should be at least two to three times the chord of the lens. This puts certain restrictions and limitations on the lenticular system to be used. For example, in larger pictures, the striae are wider and the depth of the lenticular plate is greater until it reaches a size which is bulky, inconvenient and unwieldy.

My present invention departs essentially from the aforementioned method by using a different optical system, the advantage of which will become clear in the following description. Instead of using a series of convex lenses spaced at a certain distance from the pictorial surface elements, a series of concave mirrors, or convex mirrors, or a series of alternating concave and convex mirrors, located behind the pictorial elements are used. The separation of right-eye and left-eye light beams is accomplished by the optical effect of the mirrors located behind the pictorial elements.

The invention is illustrated in the accompanying drawings in which.

Figures 8, 9, 10, 11, 12, 13, 14, 15, 16, 17, 18:
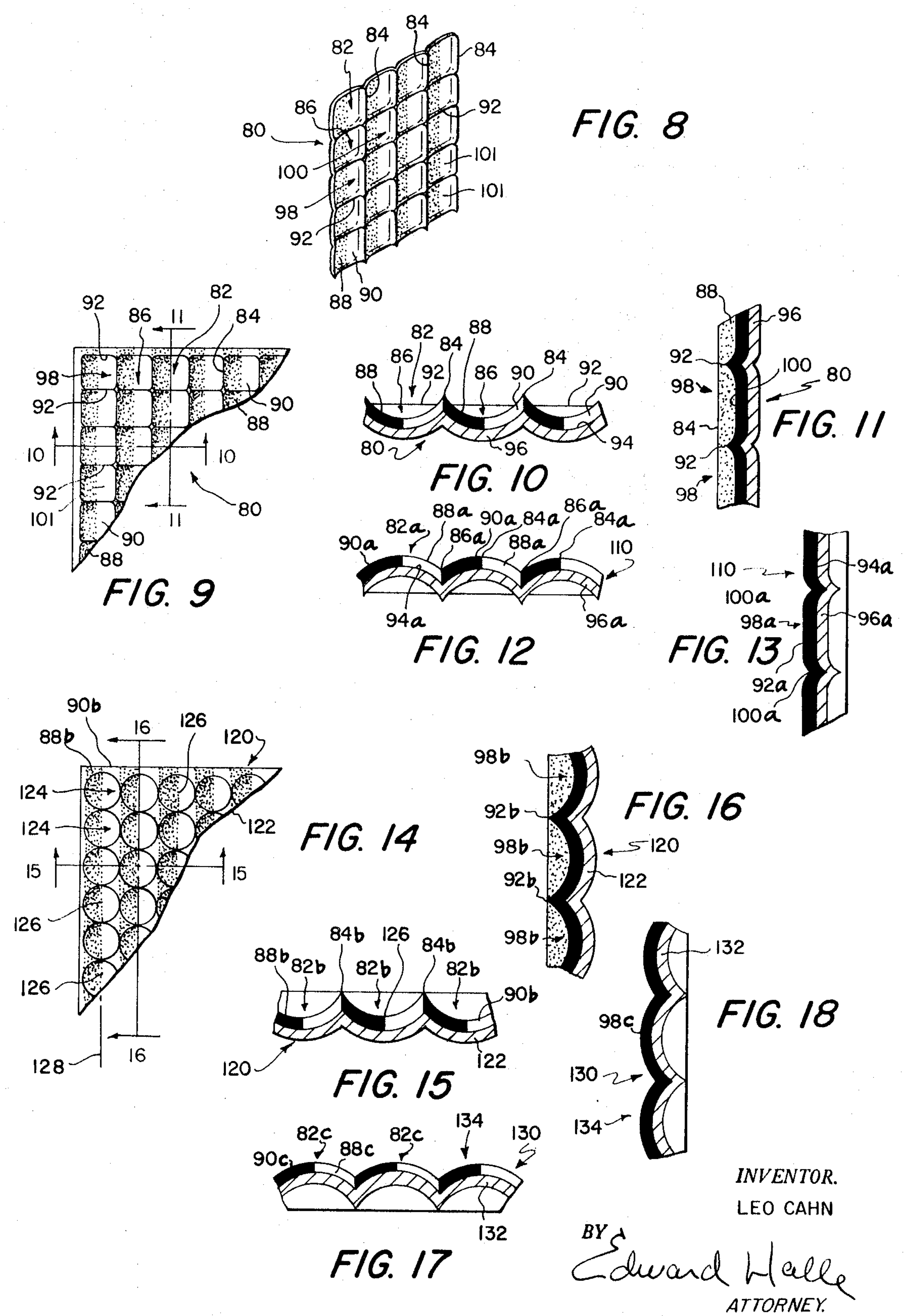
FIG. 8 is a perspective view of another form of the invention.
FIG. 9 is a plan view of the form of invention illustrated in FIG. 8 with parts cut away.
FIG. 10 is a sectional view along the lines 10—10 in FIG. 9.
FIG. 11 is a sectional view along the lines 11—11 in FIG. 9.
FIG. 12 is a sectional view of another form of the invention having convex curves, and this figure is taken from the same position as FIG. 10 except that this form of invention has convex curves rather than concave curves.
FIG. 13 is another sectional view of the form of invention shown in FIG. 12, and is taken from the same position as the sectional view of FIG. 11, except that in this form of the invention there are convex curves rather than concave curves.
FIG. 14 is a plan view of still another form of the invention with parts cut away.
FIG. 15 is a sectional view along the lines 15—15 in FIG. 14.
FIG. 16 is a sectional view along the lines 16—16 in FIG. 14.

FIG. 17 is a sectional view of another form of the invention having convex curves, and this figure is taken from the same position as FIG. 15 except that this form of invention has convex curves rather than concave curves; and FIG. 18 is another sectional view of the form of invention shown in FIG. 17, and is taken from the same position as the sectional view of FIG. 16, except that in this form of the invention there are convex curves rather than concave curves.

Similar numerals refer to similar parts throughout the several views.

Figure 1:
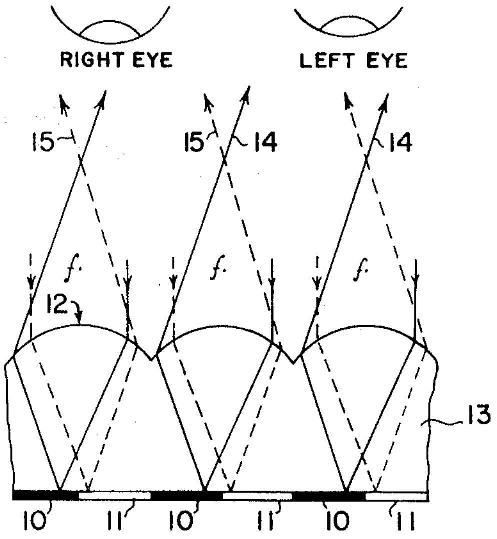
FIG. 1 is a diagrammatic cross section of the described prior art device.

The prior art which has been described hereinabove is illustrated in FIG. 1 of the drawings. This type of device or picture is well known, and all that need be said is that it comprises a picture having alternate strips 10 and 11 representing strips from left eye 10 and right eye 11 photographs. In front of an alternate pair of strips 10 and 11 is disposed a lenticular shape 12 of the facing plate 13. The disposition of the path of the light rays is shown in the figure, and line 14 shows the pattern of light rays from left eye portion of picture 10 and line 15 shows the pattern of light rays from right eye portion of picture 11. The lines 14 and 15 are intended to be representative of useful light rays coming from the picture 10, 11, and are not intended to represent all of the light rays, but merely a sufficient number of representative light rays to show how the device operates.

Figure 2:
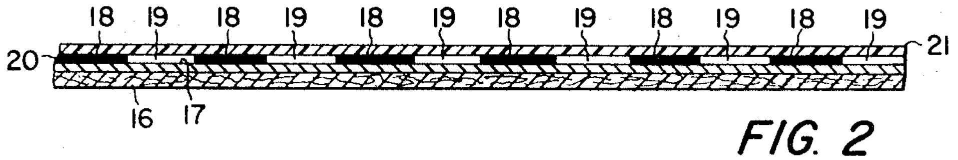
FIG. 2 is a cross section of one form of the invention in a partially prepared state.
Figure 3:
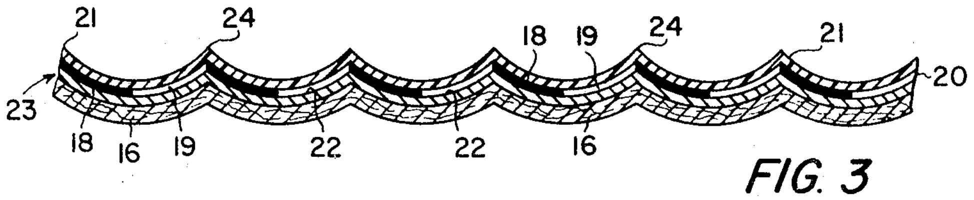
FIG. 3 is a cross section of a completed device made in accordance with the invention.

In FIG. 2 of the drawings, a partially prepared device in accordance with the invention is illustrated. First there is a backing or carrier sheet 16 which is of a conventional type such as paper, paperboard, plastic material, sheet metal or any other suitable material. Attached or bonded to carrier sheet 16 is a reflecting sheet, such as a mirror surface 17. This highly reflective sheet 17 may be in the form of a coating created by depositing a suitable metal in accordance with technically accepted methods, such as chemical or vacuum deposition, or by depositing a film former containing leaf metal particles on a carrier sheet by conventional methods, or one may choose a laminated mirroring surface such as commercially available metal foil mounted on a backing 16 of paper or paperboard. In addition, imitation metal surfaces such as fine particles of natural or synthetic mother of pearl, or a type of mica called vermiculite deposited on a carrier sheet, may be used. A polished sheet metal surface could also be used for highly reflective surface 17. In view of the foregoing, I will use the term "metallic-like" in the claims hereinbelow to mean either a reflective metallic surface or any reflective surface having the reflective qualities of a metallic surface, whether such surface be made of metal, or natural or synthetic plastic, or a combination of metal and plastic, or a reflective layer of metal or plastic or natural materials in combination with a supporting layer.

The right eye 19 and left eye 18 striae are vertical strips made from stereoscopic right eye and left eye material such as views, or photographs, and are printed on this highly reflective surface 17 using any of the conventional printing methods. This forms a substantially transparent layer 20. The transparency is provided by using transparent printing inks. The term "substantially transparent" means that light rays are permitted to go through the layer to be reflected back from the highly reflective surface 17. Thus, the substantially transparent layer could range from clear transparent to translucent, and in some small areas to approaching opaque. Finally, the entire surface may be coated with a protective layer 21 which must be a clear transparent layer.

In the preferred form of the invention, a clear vinyl or nitrocellulose lacquer is used.

The final step is to provide for the concave, convex, or alternate concave and convex reflecting surfaces of the various forms of the invention which will give the illusion of three dimensional depth when viewing the alternate striations. These are produced with highly polished accurate stampers in an embossing process well known to the art such as plate or roller embossing. Thus, in the form of invention shown in FIG. 4 of the drawings, parallel concave mirrors 22 are pressure formed in the composite sheet or picture frame 23. The mirrors 22 will have a concave optical surface that is actually formed out of the reflecting surface 17. The mirrors 22 are arranged vertically as defined hereinabove and have peaks 24 which should register as exactly as possible with a pair of alternate left eye 18 and right eye 19 striae. Thus, there will always be two neighboring alternate right eye 19 and left eye 18 striae within one concave mirror element 22 and in front of the said mirror 22. Care must be taken during the expansion of the mirrors 22 and in their formation to compensate for the deformation of the sheet so that a neighboring pair of striae will be within the width of the chord that spans from peak 24 to peak 24 of each mirror element 22. Otherwise, the important registration of these elements between picture and mirror will be lost.

Figure 4:
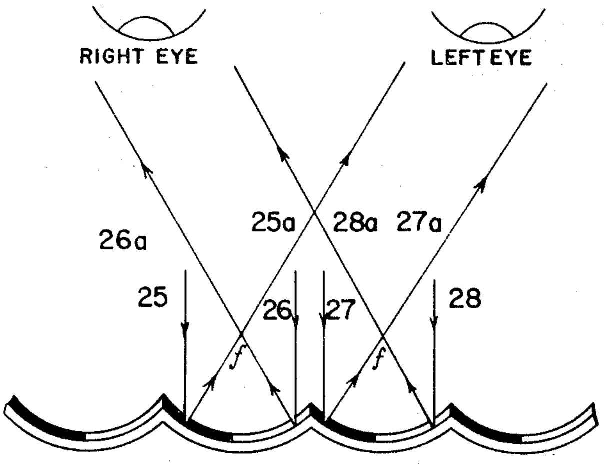
FIG. 4 is a diagrammatic representation of the manner of reflection of light rays from the alternate striae of the invention.

The concave mirrors 22 of the form of the invention as shown in FIG. 4 of the drawings are in the shape of a parabola or a circle. The depth of the mirror, in preferred form, is between 20 and 30% of the distance of the chord between the peaks of the mirrors 22. These measurements are by no means exclusive, and are given as preferred examples, and any measurement which will create the desired three dimensional illusion may be used.

In FIG. 4 of the drawings, the optical principle of the invention which obtains the same results as the prior art lenticular system is demonstrated. As mentioned before, in the conventional lenticular system, incoming light rays reflect from the right eye 11 and left eye 10 picture elements and are deflected through the focus of the lenses 12 into the eyes of the viewer. Similarly, in the device of the invention, incoming rays marked 25, 26, 27 and 28 will be deflected through the focus as rays *25a, 26a, 27a* and *28a* into the right eye and left eye of the viewer respectively as shown in FIG. 4. Some rays, naturally, will not be deflected into the right direction, and will be lost for the effect, but a large number will perform in the desired way and give us the three dimensional effect. For purposes of illustration only, rays parallel to the optical axis are illustrated. It becomes clear that this optical effect is similar, but not identical, with the one obtained with the conventional lenticular method. The difference in the two methods are so vast in their practical application that this invention has a great many advantages over the old lenticular method. The advantages are as follows:

(1) The device of the invention is less expensive to produce. There is no necessity for either a preformed plastic sheet containing the lenticular lenses nor is it necessary to flow on a plastic sheet which requires complicated and expensive machinery. Thus, the cost of these expensive procedures is eliminated and the machinery is not necessary.

(2) When the plastic lenticular system is eliminated, we eliminate the thickness of the plate as well as the weight of the plate, both of which become excessive as the picture grows larger.

(3) The device of the invention is easy to mass produce. It may be printed commercially on conventional foil for instance which may be embossed in conventional embossing machinery with the only requirement being that there be an acceptable commercial registration of the elements; and (4) A clearer picture is obtained with the device of the invention than with the lenticular system because the light beams do not have to penetrate the plastic lenses both coming and going.

In addition to providing three dimensional pictures by means of the invention, I can also provide for animated pictures by having two pictures with slightly different disposition of elements so that the illusion of movement is created as the viewer moves from side to side, or rotates the carrier sheet in front of his eyes. In addition, instead of providing for this two picture animation, one can provide for completely different pictures; for example, the name of a product and some advertising material concerning the product in alternate pictures, or a picture of the product such as a toilet soap, and then in the next picture some descriptive material about the soap.

The word "picture" or "printed picture" as used herein and in the claims heerinbelow is defined to mean a picture, design, or writing, printed by a printing press, or made by an artist, or writer, or made by a photographic process, or by any other means.

Figure 5:
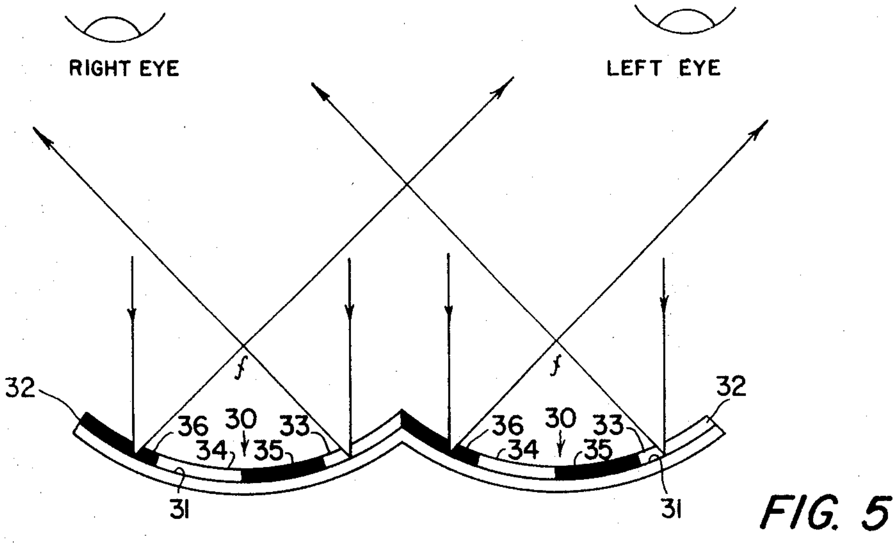
FIG. 5 is a view similar to FIG. 4 showing another form of the invention.
Figure 6:
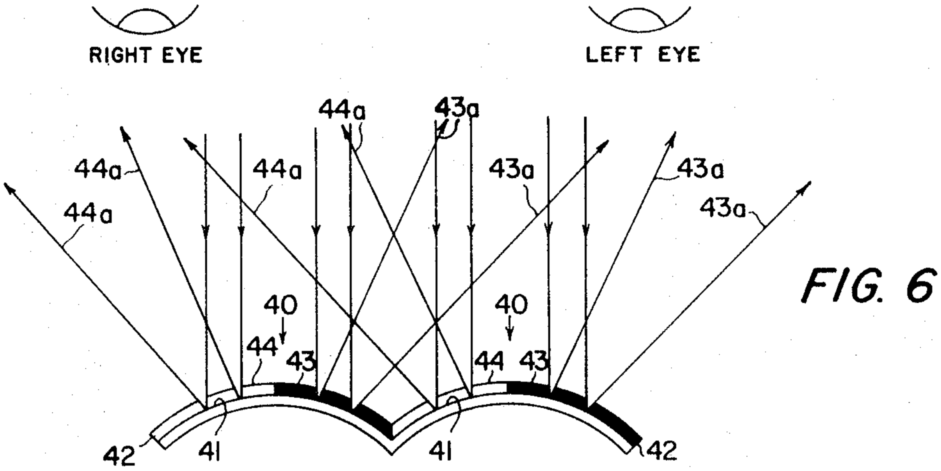
FIG. 6 is a view similar to FIG. 4 showing still another form of the invention.
Figure 7:
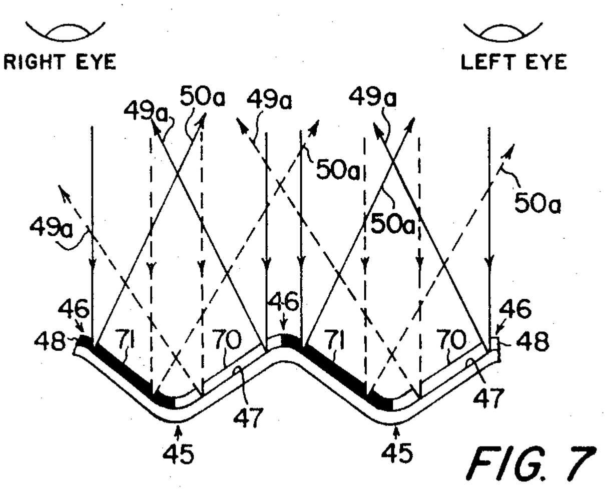
FIG. 7 is a view similar to FIG. 4 showing a further alternate form of the invention.

In FIGS. 5, 6 and 7 of the drawings, I illustrate alternate forms of the invention showing various types of vertically disposed flutings comprised either of all concave shaped flutings or convex shaped flutings, or a com bination of alternately arranged concave and convex flutings. In the form of invention shown in FIG. 5 of the drawings, the flutings 30 are concave. This form of invention is almost identical to the form of invention shown in FIG. 4 of the drawings. It has a highly reflective surface 31 and a substantially transparent layer 32 comprised of alternate striations 33 and 34 for the right eye 35 and for the left eye 36. There is an essential difference between the form of invention shown in FIG. 5 of the drawings and the form shown in FIG. 4 of the drawings. In the form shown in FIG. 4, I show a pair of alternate striations 19 and 18 for the right and left eye respectively. In FIG. 5, I show more than one striation of the right eye and left eye views within each concave or fluted portion 30. Thus, in each of the fluted concave portions 30, we find two pairs of striations, making a total of four striations, giving two striations for each eye. Although I have found that this multiple striation form as shown in FIG. 5 produces a form of invention in which some of the striations may become less effective optically, the net result is a composite picture which may have better three-dimensional appearance.

In FIG. 6 of the drawings, I show another form of the invention in which the vertical flutings are convex rather than concave. In this form of invention I provide convex mirrors as designated by reference numeral 40 having highly reflective surface 41, on top of which there is the substantially transparent layer 42 containing the striated material. In this form of the invention, since the mirrors are convex rather than concave, I provide the striations 43 for the left eye picture on the left of the device as it is seen by the eyes, and the striations 44 for the right eye picture on the right side of the flutings as viewed by the eyes. Thus, light rays **43*a* will go to the left eye and light rays 44*a*** will go to the right eye.

In FIG. 7 of the drawings, I show another form of the invention in which the flutings are alternately concave as defined by reference numeral 45, and convex as defined by reference numeral 46. This form of invention also has a highly reflective surface 47 and the substantially transparent layer 48. Alternate right eye 70 and left eye 71 striations are provided in the substantially transparent layer 48 to produce the two stereoscopic images on the composite picture. In this form of invention, the solid ray lines in FIG. 7 show the reflection of light rays from the convex portions of the flutings, and the dotted lines show the reflections of light rays from the concave portions of the flutings. Rays designated **49*a* go to the right eye, and rays designated 50*a*** go to the left eye.

It is now apparent that the flutings which I have described hereinabove define a series of small, closely spaced, alternating ridges and grooves comprising in cross section curved portions selected from either circular, parabolic, or sine curves.

In the various forms of the invention, I have shown some of the forms having only a pair of striations within each fluting, and other forms having multiple striations within each fluting. In the illustrations, I have illustrated two pairs as the multiple striations. This is by way of illustration only as there may well be three or four or even five pairs of striations within each fluting. In addition, the multiple striations may be used for either concave flutings or convex flutings, or the form of invention having the alternate concave and convex flutings, or in any form of the invention.

In FIGS. 8 through 11 of the drawings, I show another form of the invention which includes auxiliary curves to enhance the brightness of the picture. In this form of invention, the picture 80 includes curves similar to those shown in FIG. 4 of the drawings to create the three dimensional or changeable picture effect. These are circular or parabolic curves 82 forming alternate ridges 84 and grooves 86. The left and right hand striations of the printed picture are 88 and 90, and are printed within each groove 86 of a curve 82. In order to achieve greater brightness in this form of the invention, I provide a second series of curves 98 with ridges or crests 92 and grooves 100.

Since the second series of curves 98 are transverse or substantially perpendicular to the first series of curves 82, the grooves 86 and 100 of each series of curves will also be substantially perpendicular to each other, and will form a plurality of oblong or square-like forms 101 with the sides or perimeters thereof defined by the crests or ridges 84 and 92 respectively. These formations 101 are mentioned to clarify the relationships of the grooves 86 and 100. Each formation 101 contains within it a portion of a groove 86 as well as a portion of a groove 100, and is bordered by a pair of ridges 84 and a pair of ridges 92. Thus, each formation 101 is in effect a miniature representation of the entire composite picture 80. In considering the effects of the grooves 86 with their alternate ridges 84 and the grooves 100 with their alternate ridges 92, emphasis is placed on the fact that these elements act as if they were continuous sections of the curves in which they are contained as shown in FIGS. 10 and 11 of the drawings respectively. While each set of grooves and ridges is interrupted by the ridges of the perpendicular set to make the formations such as oblongs or squares 101, as will be explained hereinbelow, the functions of the curves 82 and the curves 98 are achieved as if they were incorporated into the picture 80 without the interruption of the ridges from the perpendicularly placed curves.

It is also to be understood that while FIG. 8 shows a picture 80 with only 20 square-like portions 101, this is by way of illustration only, and a picture made in accordance with the invention may have many hundreds of transverse curves and grooves, and indeed thousands of portions 101.

I refer now to FIG. 10 of the drawings in which the curves 82 are best illustrated in section. Each curve 82 has striations 88 and 90 within groove 86 over the highly reflective surface 94 of the metal-like reflective layer 96. The ridges or crests 92 of transverse curves 98 can also be seen. In FIG. 11, the sectional view showing the cross section area of the flutings of curves 98, we see the ridges 92 and the grooves 100, as well as a ridge 84 formed by a curve 82 of the first series of curves.

Thus, it is evident from a study of these drawings that there is a first series of curves designed to create the three dimensional or changeable picture effect as exemplified by curves 82, and there is a second series of curves transverse and perpendicular to the first series of curves as exemplified by the curves 98. The first series of curves create the three dimensional or changeable picture effect. In the three dimensional picture form of the invention, the striations 88 and 90 would be vertical so that they may be reflected to the right and left eye in accordance with the invention. In the changeable picture form of the invention, the striations may either be vertical or horizontal depending on whether the picture is to be rotated on a vertical or horizontal axis for the changeable picture effect. Even though I have provided the second series of transverse curves as exemplified by curves 98, there will be sufficient deflection caused by curves 82 to provide either the three dimensional or changeable picture effect in accordance with the teachings of this invention; and because of the curves 98, there will also be reflections directing light toward the eyes of the viewer to further brighten the picture. There will be a sufficient number of both types of curves within the picture to provide a three dimensional effect of a changeable picture effect and enhanced brightness.

In this form of invention, the transverse curves 98 may have crests or ridges 92 of the same height as the ridges 84 of curves 82, or may be lower in height than ridges 84. Thus, when the second (transverse) curves 98 are not as high as the first curves 82, the curves 82 creating the three dimensional (or changeable picture effect) will be the dominant ones, and the lower or shorter transverse curves 98 will be less dominant in concentrating the direction of light toward the eyes of the viewer for brightens. It is to be understood that the distance between the crests 92 of transverse curves 98 can be increased or decreased as desired so that the oblong portions 101 may be lengthened or diminished longitudinally in the direction of groove 86 of curve 82. With fewer transverse curves 98, there will be a correspondingly greater proportion of reflections from the curves 82 for the three dimensional or changeable picture effect, and with a greater number of transverse curves 98, there will be a relatively greater brightness effect. Thus, different effects can be achieved to suit the type of picture being displayed.

It is to be understood that while FIGS. 8 through 11 show a first series of concave curves 82 and a second series of transverse curves 98 interposed between the first series of curves, a picture may also be made with convex curves as the first series of curves in the manner of FIG. 6 of the drawings, together with a second series of transverse or perpendicular curves interposed between them. Such a picture 110 is illustrated in FIGS. 12 and 13 of the drawings. FIGS. 12 and 13 are respectively substantially similar to FIGS. 10 and 11 except that they illustrate convex curves rather than concave curves. Reference numeral **82*a* depicts a convex curve arrangement having convex mirrors similar to those designated by reference numeral 40 as shown in FIG. 6 of the drawings. There is a highly reflective surface 94*a* on a metallic-like reflective layer 96*a*. In this form of the invention, the equivalent of the crest or ridge of each curve would be at the point designated by reference numerals 84*a*, and the lowest point of each groove of curve 82*a* would be designated by reference numeral 86*a*. The left and right hand striations would be designated by reference numerals 88*a* and 90*a***.

Reference to FIG. 13 shows the transverse curves **98*a* having broad crest portions 92*a* and groove portions having their lowermost point at reference numerals 100*a***.

Thus, I have shown in FIGS. 12 and 13 a picture 110 similar in all respects to picture 80 except that the surface curves **82*a* are convex rather than concave. However, picture 110 will operate in the same manner as picture 80, and will reflect the proper rays for either a three dimensional or changeable picture, and will also reflect the proper rays for brightness from those parts of curves 98*a* which are adjacent to reference numeral 100*a***.

In FIG. 14 I show a portion of another picture 120 in which there are alternate striations **88*b* and 90*b*. In the three dimensional picture of the invention 120, the striations would be vertical so that they may be reflected to right and left eye in accordance with the invention. In the changeable picture form of picture 120, the striations may either be vertical or horizontal depending on whether the picture is to be rotated on a vertical or horizontal axis for the changeable picture effect. The alternate striations are printed on the sheet material 122, and then the material is placed in a press which is comprised of a series of circular male impressions, one mold of the press being said male part and one mold being a female part so that after pressing, the sheet 120 will have a series of circular depressions aligned with the striations so that each series of circular depressions 124 has a central portion 126 in alignment on the imaginary line 128 between corresponding striations 88*b* and 90*b*. Ideally, this central portion 126 should be the optical center of the curve arrangement formed in each depression 124. Thus, if a section substantially perpendicular to the striations 88*b* and 90*b*, as shown in FIG. 15, were made through each depression 124, the center 126 would be on a line 128 between striations 88*b* and 90*b*, and at the section plane, there would be a series of depressions with concave curves 82*b* substantially similar to those shown in FIG. 4 and in FIGS. 8 through 11 of the drawings. It is these curves 82*b* situated in parallel relationship which would produce the three dimensional effect in the same manner as in the form of invention shown in FIG. 4 or FIGS. 8 through 11 of the drawings. If a section were taken along a plane parallel to the striations and along line 128, as shown in FIG. 16 of the drawings, the concave curves 98*b* which are transverse to curves 82*b* would reflect light in directions transverse to the curves 82*b*. Thus, light from a picture 120 containing the depressions 124** of FIGS. 14, 15 and 16 will be reflected in all directions with relation to the eyes of the viewer.

There will be sufficient deflected reflections from curves **82*b*, in accordance with the teachings of this invention, to create a three dimensional effect or a changeable effect, and there will also be reflections from curves 98*b* directed toward the eyes of the viewer to further brighten the picture. The three dimensional or changeable effect is created because in each of the depressions 124 there is at least one curved cross section 82*b* in the depression perpendicular to the striations 88*b* and 90*b* which will deflect the light in accordance with the teachings of the invention, and it is the sum of the composite of these many curves 82*b* and the curve sections adjacent to them including the striations which will give the three dimensional, or changeable effect. The curves 82*b* of FIG. 15 are used by way of example only since there will be many other parallel sections through the depressions 124** which will have sufficient deflection with relation to the striations to contribute to the invention's effect; either three dimensional or changeable picture.

The curves **98*b* of FIG. 16 are also given by way of example only since there will be many sections parallel thereto through the depressions 124 which will have sufficient deflection transverse to the curves 82*b* to contribute to the brightness of the picture. It is to be understood that the cross sections taken in FIGS. 15 and 16 respectively are taken through the center 126 of the depressions 124, and that cross sections may be taken through depressions 124** at various axes other than perpendicular and parallel to the striations. As the sections approach the axis which is between true perpendicular and the true parallel to the striations, it may be said that the curves in these portions of the depressions will contribute both to the three dimensional effect and to the brightness effect as described herein. However, there will be throughout the depression a sufficient number of reflections from the curves to provide the three dimensional and the brightness effect.

The construction of picture 120 as illustrated in FIGS. 14, 15 and 16 provides a picture which has curves substantially equivalent to the curves of the picture of FIGS. 8 through 11. A series of sections such as those shown in FIG. 15 will provide a line of points **84*b* similar to the ridges 84 of FIG. 8, and a line of groove-like portions 82*b*** similar to the grooves 82 of FIG. 8, and there will be a sufficient number of adjoining sections or planes to the perpendicular central section of FIG. 15 to provide a sufficient area adjoining each section represented by FIG. 15 to achieve the three dimensional or changeable effect of the invention in this equivalent to the ridge and groove structure of FIG. 8. By the same token, the ridge and groove structure of FIG. 16 as exemplified at reference numerals **92*b* and 98*b* respectively is the equivalent of the ridge and groove structure of FIG. 11 represented by reference numerals 92 and 100**.

In FIGS. 17 and 18 of the drawings, I show another picture 130 in which the sheeting material 132 is provided with dome-like raised portions 134 rather than with depressed portions. In this case, the curve would be convex rather than concave but would otherwise create the same effect as the forms shown in FIGS. 14 through 16. Thus, a section as shown in FIG. 17 would provide convex curves **82*c* for deflecting light from the striations 88*c* and 90*c* for either the three dimensional or changeable picture effect, and a section as shown in FIG. 18 would provide the convex curves 98*c* for deflecting the light for brightness. Thus, aside from the domes 134** being convexly rather than concavely curved, this form is similar to the form of FIGS. 14 through 16.

The dome shapes shown in FIGS. 14 through 17 may be oval rather than circular to provide different three-dimensional, changeable and brightness effects as described hereinabove.

While I have described my invention in its preferred forms, there are other forms which it may take without departing from the spirit and scope of the invention. For example, the striae of the right and left eye pictures of the invention can be printed directly on highly polished metal sheets by metal lithographic methods in transparent ink. The highly polished metal can then be put through an embossing process to create the concave mirrors as aforesaid.

Another example would be to preform a sheet of metal, or foil, with a highly reflective surface already embossed with the mirrors in place, and then deposit a transparent decal or printing directly on the preformed metal. The printing may also be done in the usual manner of offset printing or by silkscreen printing.

Another example of a sheet with a metallic-like reflective layer would be of a preformed plastic sheet in fluted form in accordance with the invention carrying a highly reflective surface or mirror on the back. On the face of the sheet, I would provide a photosensitive emulsion or layer. The sheet as thus prepared would then be exposed in a camera the same as any senitized plate with the exception that the camera for the exposure would be a special stereoscopic type of camera in which the right eye lens would expose striations of the right eye picture and the left eye lens would expose striations of the left eye picture, and the striations would be alternated in accordance with this invention. In making and exposing the negative of this example, an apparatus and method as described in U.S. Letters Patent No. 2,506,131 granted on May 2, 1960 on application of Maurice Bonnet may be used.

Another example of sheets with metallic-like surfaces would be the preparation of flexible fluted sheets out of a material with a highly reflective surface such as a parallel arrangement of thin metal wires, or filaments made of fiberglass, or synthetic resins possessing a metal-like reflectivity. These wires or filaments placed together would form the fluted or convex face necessary for the invention would, in turn, could be covered with a striated pair of pictures as in the other forms of the invention.

There may also be other forms of the invention which will become readily apparent to those skilled in the art, and I, therefore, desire to be protected for all forms coming within the claims hereinbelow.

Wherefore I claim:

1. A stereoscopic picture comprising a reflective sheet having a first series of vertically running spaced alternating ridges and grooves defining a cross section comprising curved portions selected from circular or parabolic curves, and having a printed picture applied on a surface thereof, said stereoscopic picture also having a second series of curves substantially perpendicular to said first series of curves.

2. The stereoscopic picture as defined in claim 1 comprising a first view and a second view disposed in alternate striation arrangement on said vertically running ridges and grooves, with at least one respective striation of the first view and at least one respective striation of the second view positioned within each of said vertically curved portions.

3. A stereoscopic picture as defined in claim 1, in which the picture is multi-colored.

4. A stereoscopic picture as defined in claim 1 which is comprised of said circular or parabolic curved portions in the form of convex curves.

5. The stereoscopic picture as defined in claim 1, which is comprised of said circular or parabolic curved portions in the form of concave curves.

6. The stereosopic picture as defined in claim 1, in which the reflective sheet is comprised of a flexible reflective metal-like sheet in combination with a supporting layer of material.

7. A changeable picture comprising a reflective sheet having a first series of parallel running spaced alternating ridges and grooves defining a cross section comprising curved portions selected from circular or parabolic curves, and having a printed picture applied on a surface thereof, said changeable picture also having a second series of curves substantially perpendicular to said first series of curves.

8. The changeable picture as defined in claim 7 comprising a first view and a second view disposed in alternate striation arrangement on said parallel running ridges and grooves, with at least one respective striation of the first view and at least one respective striation of the second view positioned within each of said first mentioned parallel curved portions.

9. A changeable picture as defined in claim 7, in which the picture is multi-colored.

10. A changeable picture as defined in claim 7 which is comprised of said circular or parabolic curved portions in the form of convex curves.

11. The changeable picture as defined in claim 7, which is comprised of said circular or parabolic curved portions in the form of concave curves.

12. The changeable picture as defined in claim 7, in which the reflective sheet is comprised of a flexible reflective metal-like sheet in combination with a supporting layer of material.

References Cited

UNITED STATES PATENTS

| | | | |
|---|---|---|---|
| 856,519 | 6/1907 | Deeks | 161—33 |
| 1,996,539 | 4/1935 | Dufay | 161—34 |
| 2,086,556 | 7/1937 | Jacobson | 350—128 |
| 2,313,489 | 3/1943 | Latrobe | 161—34 |
| 2,351,034 | 6/1944 | Gabor | 350—167 |
| 3,151,520 | 10/1964 | Nadeau | 350—167X |

JOHN T. GOOLKASIAN, Primary Examiner

H. F. EPSTEIN, Assistant Examiner

U.S. Cl. X.R.

40—106.51; 161—4, 33, 55, 123; 350—167; 352—58, 81